(12) United States Patent
Skinner

(10) Patent No.: US 6,651,544 B2
(45) Date of Patent: Nov. 25, 2003

(54) CONTROLLING THE DEADBAND OF A FLUID SYSTEM

(75) Inventor: Thomas G. Skinner, Aurora, IL (US)

(73) Assignee: Caterpillar Inc, Peoria, IL (US)

( * ) Notice: Subject to any disclaimer, the term of this patent is extended or adjusted under 35 U.S.C. 154(b) by 100 days.

(21) Appl. No.: 10/028,665

(22) Filed: Dec. 28, 2001

(65) Prior Publication Data

US 2003/0121257 A1 Jul. 3, 2003

(51) Int. Cl.[7] ................................................. F15B 9/09
(52) U.S. Cl. ......................... 91/363 R; 91/361; 91/364
(58) Field of Search .............................. 91/363 R, 361, 91/364

(56) References Cited

U.S. PATENT DOCUMENTS

| | | | |
|---|---|---|---|
| 3,821,625 A | 6/1974 | Scholl ........................ 318/624 |
| 4,846,233 A | 7/1989 | Fockens ..................... 141/94 |
| 4,960,568 A | 10/1990 | Matsumoto et al. .......... 422/83 |
| 5,535,533 A | 7/1996 | Romanchok ................. 37/403 |
| 5,737,993 A | 4/1998 | Cobo et al. .................... 91/361 |
| 5,784,945 A | 7/1998 | Krone et al. .................. 91/361 |
| 5,848,609 A | 12/1998 | Marchesseault et al. ..................... 137/624.11 |
| 6,029,529 A | 2/2000 | Recker et al. ............. 73/866.1 |
| 6,209,321 B1 | 4/2001 | Ikari ........................... 60/422 |
| 6,305,162 B1 | 10/2001 | Cobo et al. .................... 60/422 |

FOREIGN PATENT DOCUMENTS

| | | |
|---|---|---|
| DE | 198 39 062 A1 | 3/1999 |
| GB | 2 291 987 | 2/1996 |

*Primary Examiner*—Edward K. Look
*Assistant Examiner*—Michael Leslie
(74) *Attorney, Agent, or Firm*—Finnegan, Henderson, Farabow, Garrett & Dunner

(57) ABSTRACT

A method for controlling a fluid system is provided. The system may include a hydraulic circuit having a pump driven by an engine, wherein the pump delivers fluid to an actuator through a valve assembly. The method may include receiving an operator input and determining a condition of the hydraulic circuit. The condition of the hydraulic circuit may include at least one of a flow rate of fluid to the actuator, an engine speed, and a pump displacement. The method may include determining a valve transform function as a function of a position of a linkage associated with the actuator and the condition of the hydraulic circuit. The method may further include determining a valve command in response to the valve transform function and the operator input, wherein the valve command results in a consistent deadband. The valve command is delivered to the valve assembly.

19 Claims, 6 Drawing Sheets

CONTROLLING THE DEADBAND OF A FLUID SYSTEM

TECHNICAL FIELD

This invention relates generally to a fluid system, and more particularly, to a method and apparatus for controlling a deadband of a fluid system.

BACKGROUND

Fluid control systems located on work machines include an operator interface for enabling the operator to control the fluid system and a hydraulic circuit for controlling the work implements of the machine in response to the operator's inputs. The operator interface may include joysticks adapted to receive the operator inputs and generate the appropriate input signals to control the fluid system. A controller receives the inputs signals and determines the appropriate valve commands. The valve commands are delivered to a valve assembly, or control valve, which controls the fluid flow from a pump to an actuator. The valve assembly may include a pilot valve and a main valve.

An implement of a work machine is connected to one or more actuators through linkages having a linkage position associated with the position of an implement. For example, in a track-type tractor, the movement of the blade is controlled in several directions. The blade may be lifted or lowered by pivoting a C-frame about a linkage point on a main frame of the tractor. The blade may be pitched by pivoting a linkage point on the blade with respect to the C-frame.

The controller determines a valve command in response to the operator input signal and associated hydraulic circuit signals, such as the signal received from an engine speed sensor. The valve command signal is then delivered to the appropriate valve assembly. In some machines, the valve command signal may be delivered to the solenoid of the pilot valve located within the valve assembly. The solenoid is then energized and controls the valve spool within the pilot valve to achieve an appropriate position in response to the valve command signal. The pilot valve then responsively delivers a pilot pressure to the main valve in order to move the main valve, or the spool within the main valve, to the desired position. The main valve then enables fluid to be delivered to the actuator.

In a fluid control system, there is a deadband associated with the movement of the joystick from a neutral position to a position where an initial movement of the actuator being controlled occurs. This deadband may be referred to as a first motion deadband. The deadband may be associated, in part, with the change in valve position needed in order to provide an appropriate amount of fluid flow to the actuator in order to initiate actuator movement.

The responsiveness of the actuator may be dependent, in part, on the fluid pressure and fluid flow rate delivered to the actuator. The fluid pressure and fluid rate may in turn be dependent, in part, on the main valve position, engine speed, and pump displacement.

A first motion deadband represents the amount that the main valve stem must move before the associated actuator, for example, a cylinder, moves due to fluid pressure. The first motion deadband also corresponds with movement of the joystick from an initial position of the joystick to a position where the initial movement of the actuator occurs. The amount of movement of the joystick corresponding with the first motion deadband may be programmed to meet operator specifications. This amount of movement is generally consistent for a given engine speed, pump displacement, and load. However, if the pump engine speed is reduced, for example, from a high idle to a low idle speed, then the same joystick command at the high idle speed will not cause the same response of the actuator at the low idle speed. Therefore, the joystick command will need to be increased, for example, as the engine speed is reduced, in order to provide enough fluid flow to the actuator to achieve the same actuator response as in the high idle condition.

Some conventional fluid systems account for these various factors, including certain load-induced, operating conditions, that may cause deadband inconsistencies. For example, U.S. Pat. No. 5,784,945 to Krone et al. discloses a system having a desired velocity manager and a load responsive device that determine a desired velocity of a load and a characteristic of the load, for example, weight. The desired velocity and load characteristic are used to determine a valve transform curve, which is then used to control operation of a valve that controls fluid flow to an actuator operating on the load.

However, other operating conditions, for example, linkage position, may also cause variations in the first motion deadband. Variations in first motion deadband may result in an inconsistent operator interface, which reduces the efficiency of the operator. Moreover, such variation may lead to errors in the operation of the machine.

The present invention is directed to overcoming one or more of the problems identified above.

SUMMARY OF THE INVENTION

A first exemplary embodiment of the invention provides a method for controlling a fluid system. The system may include a hydraulic circuit having a pump driven by an engine, wherein the pump delivers fluid to an actuator through a valve assembly. The method may include receiving an operator input and determining a condition of the hydraulic circuit. The condition of the hydraulic circuit may include at least one of a rate of fluid flow to the actuator, an engine speed, and a pump displacement. The method may further include determining a valve transform function as a function of the condition of the hydraulic circuit and a position of a linkage associated with the actuator. The method may include determining a valve command in response to the valve transform function and the operator input and delivering the valve command to the valve assembly.

Another exemplary embodiment of the invention describes a method for controlling a fluid system. The system may include a hydraulic circuit having a pump driven by an engine, wherein the pump delivers fluid to an actuator through a valve assembly. The method may include establishing a first motion deadband, receiving an operator input, determining a position of a linkage associated with the actuator, and determining a rate of fluid flow to the actuator. The method may further include determining a valve command in response to at least one of the fluid flow rate, the linkage position, the first motion deadband, and the operator input, wherein the valve command may result in a consistent deadband.

According to another exemplary embodiment of the invention, a fluid system may include a hydraulic circuit having a pump, an engine structured and arranged to drive the pump, an actuator, and a valve assembly operable to control flow of pressurized fluid from the source of pressurized fluid to the actuator. The system may further include a linkage associated with the actuator and an input controller configured to receive an operator input and responsively generate an input signal. A controller may be configured to receive the input signal, a linkage position signal, and at least one of a flow rate signal corresponding to fluid flow to the actuator, an engine speed signal, and a pump displacement signal. The controller may also be configured to determine a valve transform function in response to the linkage position signal and at least one of the fluid flow rate signal, the engine speed signal, and the pump displacement signal. The controller may be further configured to determine a valve command in response to the input signal and the valve transform function, the valve command resulting in a consistent deadband.

The foregoing summarizes only a few aspects of the invention and is not intended to be reflective of the full scope of the invention. Additional features and advantages of the invention are set forth in the following description, may be apparent from the description, or may be learned by practicing the invention. Moreover, both the foregoing summary and the following detailed description are exemplary and explanatory and are intended only to provide further explanation of the invention.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

DETAILED DESCRIPTION

Reference will now be made in detail to the present exemplary embodiments of the invention, which are illustrated in the accompanying drawings. Wherever possible, the same reference numbers will be used throughout the drawings to refer to the same or like parts.

Figure 1:
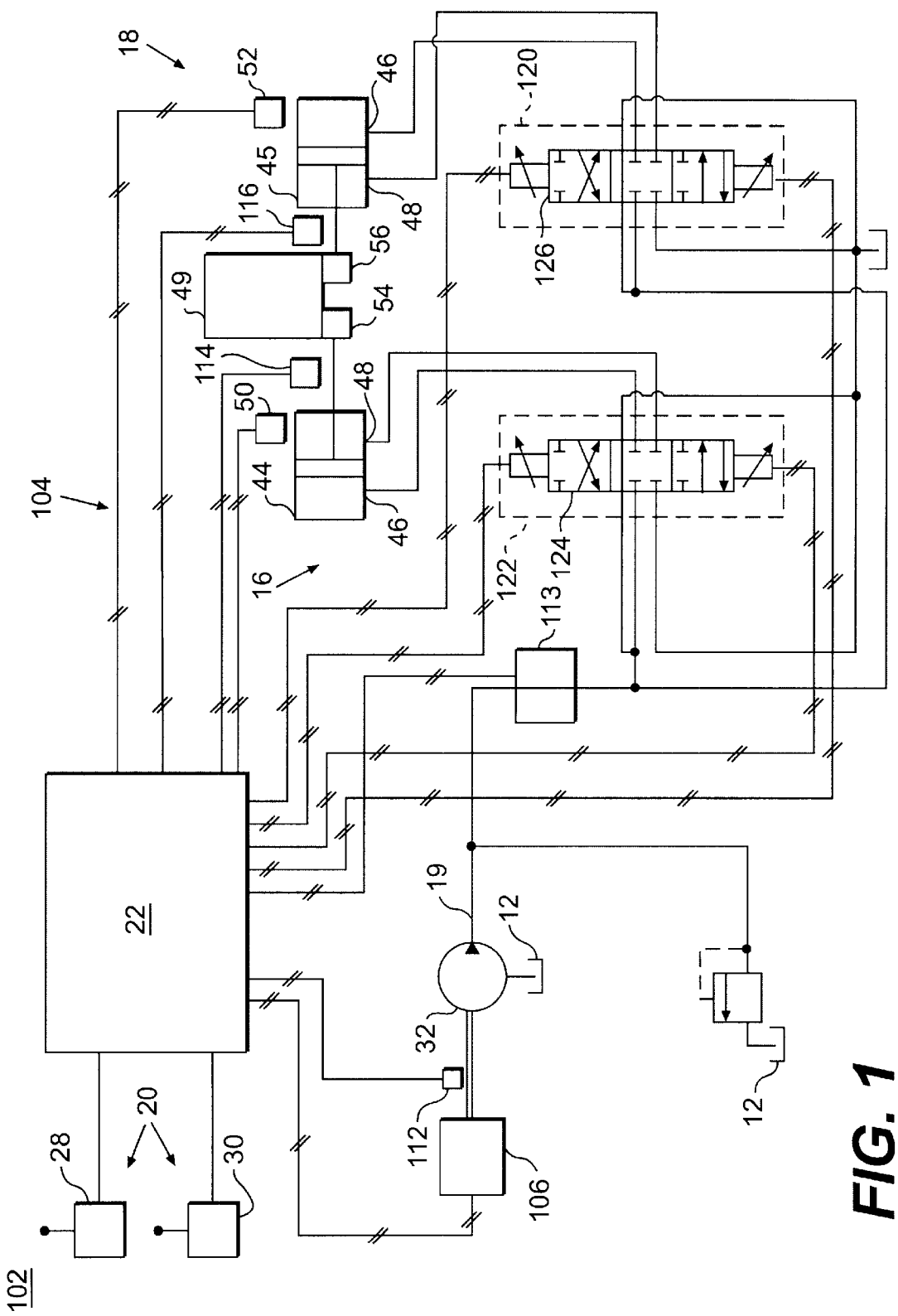
FIG. 1 is a schematic illustration of an exemplary embodiment of a fluid system.

FIG. 1 is a schematic illustration of an exemplary embodiment of a fluid system 102. In one embodiment of the present invention, the fluid system 102 may include a hydraulic circuit 104. The hydraulic circuit 104 may include a fluid reservoir, or tank 12, a source of pressurized fluid 32, and a pump engine 106 connected to the fluid source 32. The source of pressurized fluid 32 may be either a fixed displacement pump or a variable displacement pump. The system 102 may also include first and second actuator circuits 16, 18 connected in parallel to the pump 32 by a fluid conduit 19, an input controller 20, an electrical controller 22, such as a microprocessor, connected to the input controller 20, and an electro-hydraulic fluid flow control mechanism (not shown). While two actuator circuits 16, 18 are illustrated in this exemplary embodiment, implemented systems may contain as few as one actuator circuit or more than two actuator circuits.

The input controller 20 may include first and second control lever mechanisms 28, 30, e.g., joysticks, that are each connected to the electrical controller 22 and operative to output an electrical signal to the electrical controller 22 proportional to an input from an operator. It should be appreciated that each of the control lever mechanisms 28, 30 may be moved forward and rearward, for example, to dump and rack.

Each of the first and second actuator circuits 16, 18 may include an actuator 44, 45, with each actuator having first and second fluid ports 46, 48. Each actuator 44, 45 may be mechanically coupled to a work implement 49 by a corresponding linkage 54, 56. It should be appreciated that, in other exemplary embodiments, a work implement may be operated by one actuator or by more than two actuators.

In an exemplary embodiment, the first and second actuator circuits 16, 18 may each include a valve assembly 120, 122 including, for example, a control valve. The valve assemblies 120, 122 may each include an open centered valve 124, 126, respectively. However, as will be described below, other types of valves may be used in the valve assemblies 120, 122.

The system 102 may include a speed sensor 112 configured to determine the speed of the pump engine 106. The engine speed sensor 112 may deliver a sensed speed signal to the controller 22. In one embodiment, the speed sensor 112 may be a device sensitive to the passing of gear teeth by a magnetic pickup mounted to the engine 106, as is well known in the art. The system 102 may further include a fluid flow sensor 113 for sensing the rate of fluid flow from the source 32. The fluid flow sensor 113 may provide a fluid flow signal to the controller 22.

The system 102 may include at least one position sensor 50, 52 configured to determine the position of an actuator 44, 45. The position sensors 50, 52 may provide a position signal to the controller 22. The system may also include one or more linkage position sensors 114, 116 for determining the position of the linkages 54, 56 associated with the work implement 49. The linkage position sensors 114, 116 may provide linkage position signals to the controller 22. The linkage position sensors 114, 116 may be of many types, including linear position sensors and rotary position sensors, or resolvers. The linear position sensors may sense, for example, stroke displacement. The rotary position sensors may sense a rotational displacement, which in turn, is converted into a linear quantity, for example, cylinder position.

The controller 22 receives inputs from the joysticks 28, 30 and the speed sensor 112, and responsively controls the motion of the actuators 44, 45 by providing the appropriate valve position commands, i.e., command signals, to the valve assemblies 120, 122.

The first motion of an actuator 44, 45 may be described as occurring when the actuating force of the actuator 44, 45 is greater than the opposing force. The first motion deadband may be described as the deadband associated with movement of the first and/or second control lever mechanism 28, 30 from a neutral position to a position where a first motion, or initial movement, of the actuator 44, 45 occurs; that is, the amount of travel of the control lever mechanism 28, 30 needed before the actuator 44, 45 begins to respond.

For example, if the first movement of the actuator 44 occurs when the first control lever mechanism 28, for example, a joystick, is located at a position of two degrees from neutral, or a two degree deflection, then the first motion deadband may be considered to be two degrees. However, if the engine speed is reduced, for example, from 2100 rpm to 1000 rpm, then it may take a five degree deflection before the initial actuator movement occurs. The joystick position variation, or increased deadband, is due in part to the general characteristic that as the fluid flow rate is reduced by the engine speed reduction, a larger valve displacement from pump to actuator is needed to enable more fluid flow, and thus fluid pressure, to the actuator. The larger valve displacement is needed to offset the effect of the reduced engine speed. Therefore, the first control lever mechanism 28 is moved further in order to achieve an adequate valve command and associated fluid flow. The first motion deadband, in this example, has increased from two to five degrees.

Similarly, a two degree deflection may be sufficient to initiate movement of a blade implement on a C-frame. However, once the blade has been raised from a lower to a higher position and stopped, it may then take a five degree deflection of the first control lever mechanism 28 before the initial actuator movement occurs. While. The joystick position variation, or increased deadband, is due in part to the general characteristic that as the opposing force produced by the greater height of the work implement is increased, a larger valve displacement, from pump to actuator, is needed to enable more fluid flow, and thus fluid pressure, to the actuator. The larger valve position is needed to offset the effect of the increased implement pressure. Therefore, the control lever mechanism 28, 30 is moved further in order to achieve an adequate valve command, and associated fluid flow. The first motion deadband, in this example, has increased from two to five degrees.

Figure 2:
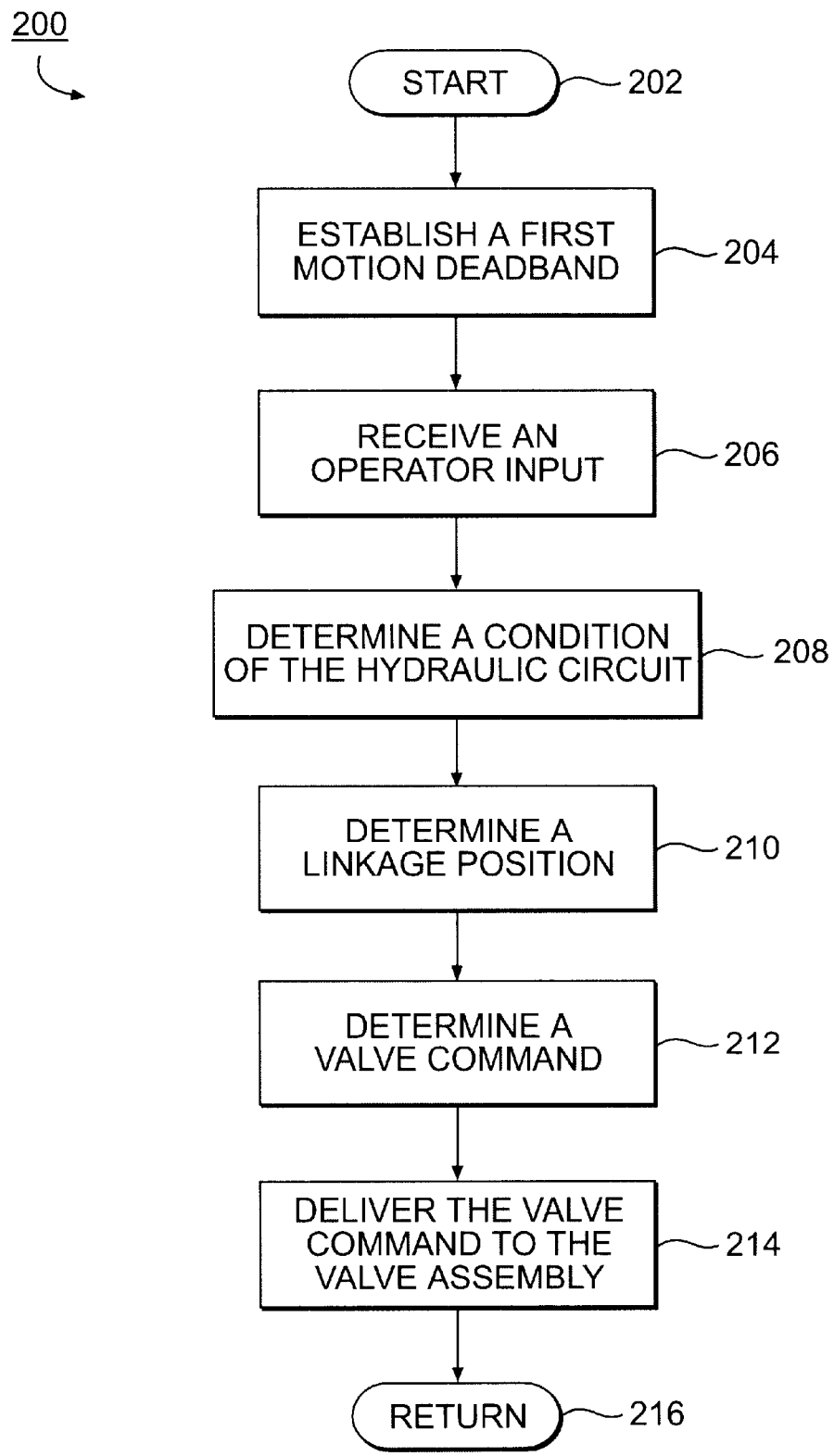
FIG. 2 is a flow chart of one method for controlling a fluid system in an exemplary embodiment of the present invention.

FIG. 2 illustrates one embodiment for an operation 200 for controlling a fluid system, which commences with step 202 and then continues to step 204. In step 204, a first motion deadband is established, or calibrated. In an exemplary embodiment of the present invention, the first motion deadband of the system 102 may be empirically determined. For example, the engine speed may be set to high idle (e.g., 2100 r.p.m.), the pump displacement may be maintained at a maximum displacement, and the linkage may be maintained at a predetermined position. Therefore, the conditions of the linkage position and the hydraulic circuit 104 such as engine speed, pump displacement, and fluid flow rate may be maintained at a steady value. An actuator 44, 45 may then be commanded to move. In one embodiment, a control lever mechanism 28, 30, for example, a joystick, may be moved from a neutral position, for example, to a first position commanding an extension of an actuator 44, 45. The command may be delivered to the controller 22, and the controller 22 may determine and deliver a corresponding valve command to the valve assembly 120, 122, which enables the valve 124, 126 to move to an appropriate position. The range between the initial joystick position and the position of the joystick where the first actuator motion occurs, e.g., three degrees, may be referred to as a calibrated, or established, first motion deadband. Control continues to step 206.

Figure 3:
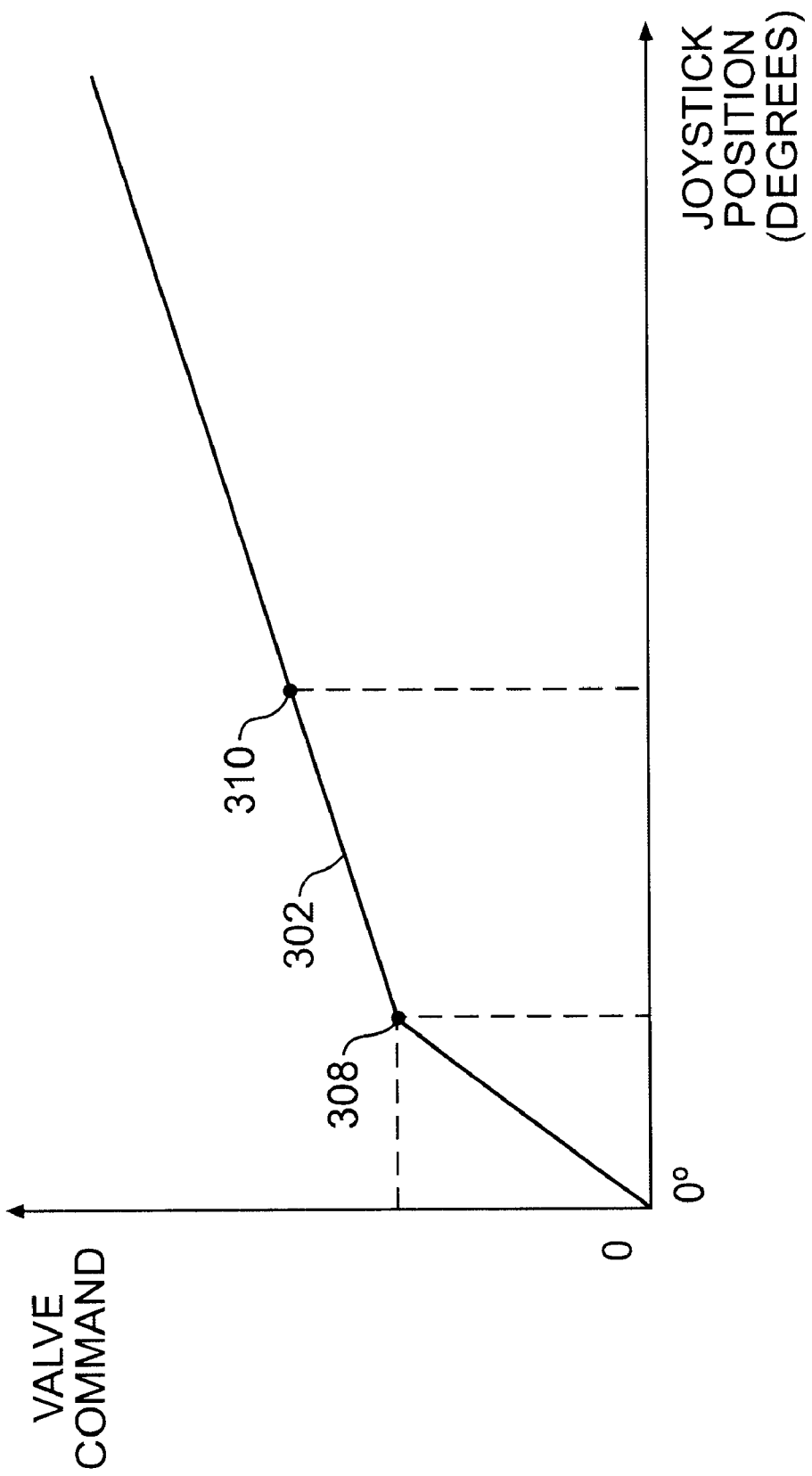
FIG. 3 is a graph of a command curve as a function of joystick input and valve command in an exemplary embodiment of the present invention.

By way of example, FIG. 3 illustrates a command curve 302 resulting in a calibrated, or established, first motion deadband 308 as a function of the joystick input and the valve command delivered to the valve assembly 120, 122. The command curve 302 is utilized to establish the first motion deadband in step 204 and is further used throughout the process once initially established. The resulting command curve 302 may be referred to as a calibrated command curve. In one embodiment, the calibrated command curve 302 may be established by determining a desired first motion deadband, e.g., three degrees. Then, through empirical analysis, the valve command may be calibrated, for instance, by establishing a calibration point 310, to deliver the appropriate current (i.e., the valve command) to the valve assembly 120, 122 so that the valve 124, 126 will achieve the appropriate position, at a three degree joystick deflection, to cause first motion of the cylinder 44, 45 at the given engine speed, pump displacement, and linkage position. In an exemplary embodiment, the first motion of the actuator may be visually detected by seeing the appropriate work implement or actuator 44, 45 move. Alternatively, position sensors 50 adapted to sense the position of the actuator 44, 45 may be used to detect the motion and position of the actuator 44, 45.

The calibrated curve 302 and associated joystick positions and valve commands may be stored in a table, in memory, and referred to as a calibrated command table. Alternatively, other known forms of memory storage may be used, such as storage on removable or magnetic media. A joystick input may be compared to the calibrated table to determine the appropriate valve command. When the conditions of the linkage position and hydraulic circuit 104 are the same as when the calibrated table was determined, the first motion deadband should be the same.

Returning to the operation 200 of FIG. 2, in step 206, during the operation of the machine, an operator input is received by the controller 22. The input command is received from a control lever mechanism 28, 30, for example, a joystick, in response to operator manipulation.

Then, in step 208 of FIG. 2, a condition of the hydraulic circuit 104 located in the fluid system 102 is determined. In an exemplary embodiment of the present invention, hydraulic circuit conditions may include the engine speed and the pump displacement. Those skilled in the art will appreciate that other hydraulic circuit conditions could also be utilized. In an alternative embodiment, the condition may include the fluid flow rate and/or the work function the machine is performing. Examples of work functions include raise, lower, rack, dump, tilt, tip, and hoist functions, and will be discussed further below. In one exemplary embodiment, the conditions of the hydraulic circuit 104 may be continuously monitored and available when an operator input is received. In additional exemplary embodiments, the conditions of the hydraulic circuit 104 may be made available periodically, or may only be monitored at times when an operator input is received. Control continues to step 210.

In step 210, a position of a linkage 54, 56 associated with an actuator 44, 45 may be determined. This determination may be made based on inputs from corresponding linkage position sensors 114, 116. Control then continues to step 212.

In step 212 of FIG. 2, a valve command is determined in response to the linkage position, the hydraulic circuit condition, and the operator input. The command is determined such that the resulting first motion deadband is consistent with the established first motion deadband. That is, for example, even though the linkage position, the engine speed, and/or the pump displacement may have changed, the first motion deadband is the same, or within a threshold, of the established first motion deadband. Control continues to step 214.

Figure 4:
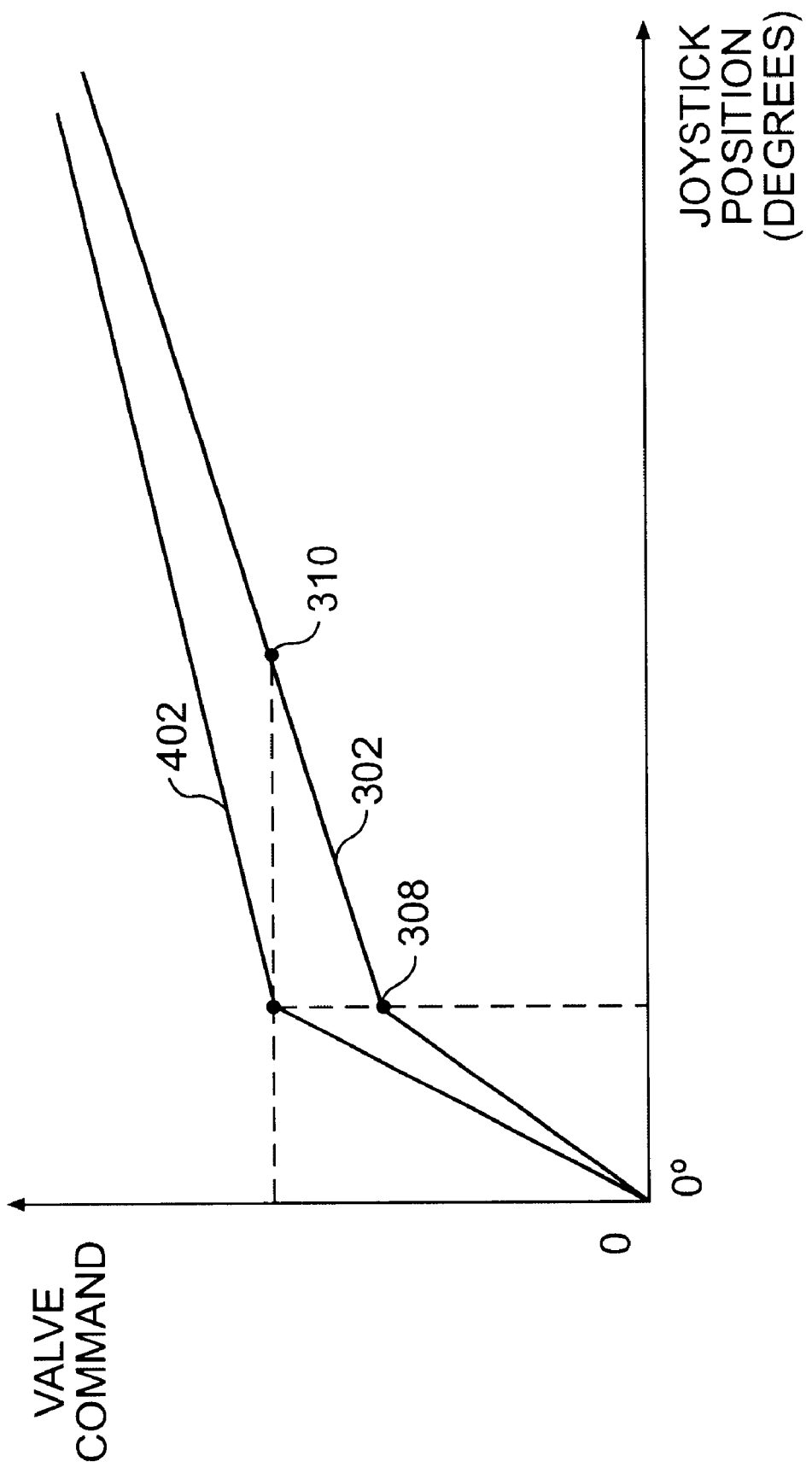
FIG. 4 is a graph of a command curve as a function of joystick input and valve command for different engine speeds in an exemplary embodiment of the present invention.

In an exemplary embodiment of the present invention, the appropriate valve command may be determined through an operator input and a valve transform function. The valve transform function may be a function of the linkage position and the condition of the hydraulic circuit, for example, the engine speed and the pump displacement. A command curve, such as the calibrated command curve 302, may be empirically determined for a range of pump engine speeds, linkage positions, and pump displacements, such that each curve results in the consistent first motion deadband 308. Adjusted command curves, establishing the valve transform function, may be developed for: high idle, medium idle, and low idle engine speeds; maximum and minimum pump displacements; and various linkage positions ranging from a predetermined fully-retracted position to a predetermined fully-extended position, minimum lift to maximum lift, and fully-dumped to fully-racked-back. For example, at maximum pump displacement, a low idle engine speed, and the predetermined position of the linkage, an adjusted command curve 402 may result in a consistent deadband 308, as illustrated in FIG. 4. The adjusted command curve 402 may then be compared to the calibrated command curve 302. A valve command offset may then be determined for each adjusted command curve, based on the difference between the calibrated command curve 302 and the adjusted command curve, such that the first motion deadband of each curve is consistent with the established first motion deadband 308.

A valve command offset table may be established and stored for a range of varying engine speeds, linkage positions, and pump displacements, as well as for other variables of the hydraulic circuit that have an effect on the deadband. During the operation of the system 102, to determine an appropriate adjusted command curve, the calibrated command curve 302 (which was developed at high idle, maximum pump displacement, and the predetermined position of the linkage) is accessed to determine a calibrated command. Then a calibrated command offset is determined by utilizing the valve transform function based on the linkage position and the hydraulic circuit condition, for example, the determined actual engine speed and pump displacement, and by accessing the appropriate offset from the calibrated offset table. The calibrated offset is then added to the calibrated command, resulting in a valve command that will result in the appropriate valve position when delivered to the valve assembly 120, 122. The determined valve command will then result in the established first motion deadband.

In step 214, once the valve command is determined, the controller 22 delivers the command to the valve assembly 120, 122, which enables the valve 124, 126 to move to the appropriate position, thereby controlling the operation of the hydraulic circuit 104. Control then continues to step 216 where control is returned to step 202.

Figure 5A:
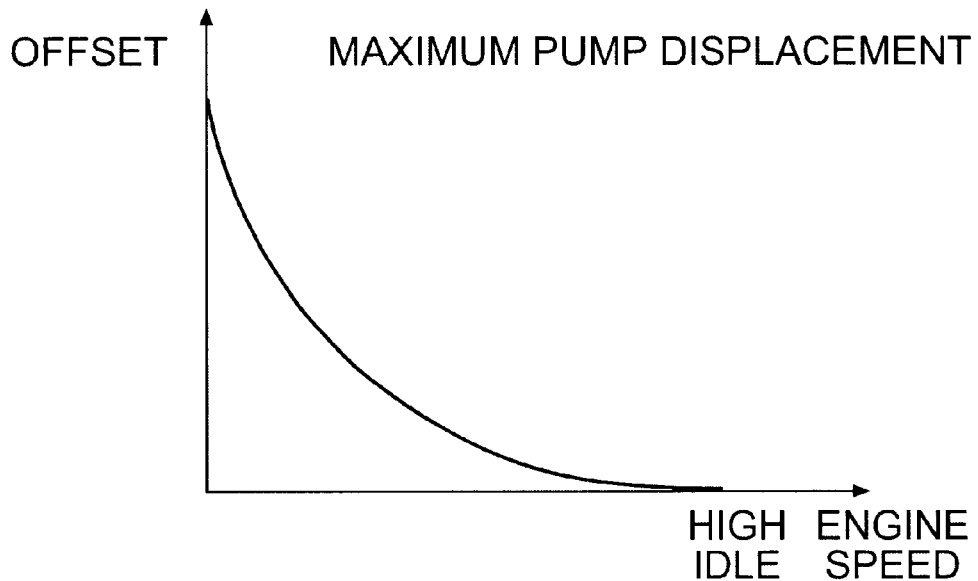
FIG. 5A is a graph of valve command offset as a function of pump displacement and engine speed in an exemplary embodiment of the present invention.

By way of example, FIG. 5A illustrates a valve command offset curve as a function of engine speed, for a maximum pump displacement and a predetermined position of the linkage. This valve command offset curve, as described above, may be used to determine a calibrated offset that will be added to the calibrated command curve to determine a valve command. As seen from the curve in FIG. 5A, at a high idle engine speed, no offset is required to be added to the calibrated command curve to generate a valve command because the calibrated command curve was generated at a maximum pump displacement with the engine speed at high idle and the linkage in the predetermined position. As the engine speed decreases, the offset is increased as illustrated in the graph of FIG. 5A.

Figure 5B:
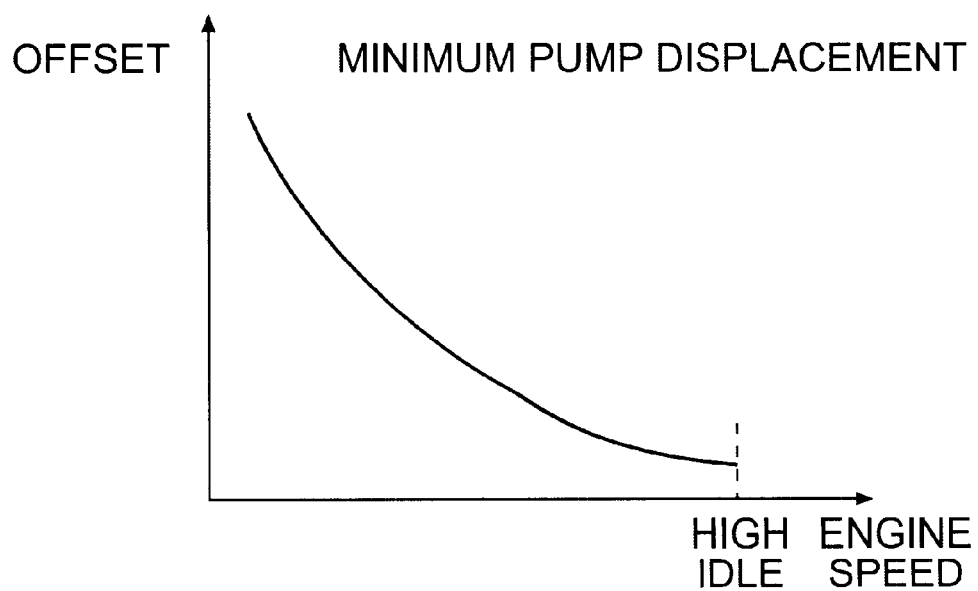
FIG. 5B is a graph of valve command offset as a function of pump displacement and engine speed in an exemplary embodiment of the present invention.

FIG. 5B illustrates one example of a valve command offset curve, as a function of engine speed, for a minimum pump displacement and the predetermined position of the linkage. This valve command offset curve, as described above, may be used to determine a calibrated offset that will be added to the calibrated command curve to determine a valve command. As seen from the curve in FIG. 5B, at a high idle engine speed, a small offset may be required to be added to the calibrated command curve to generate a valve command because the calibrated command curve was generated at a maximum pump displacement (not a minimum pump displacement) with the engine speed at high idle and the linkage in the predetermined position. As the engine speed decreases, the offset may be increased as illustrated in the graph of FIG. 5B.

While FIGS. 5A and 5B illustrate calibration offset maps for only a single variable (i.e., pump displacement), calibration offset maps may be generated for any number of variables creating n-dimensional calibration offset maps. For example, calibration offset maps may be generated for linkage position versus engine speed and/or linkage position versus pump displacement.

Figure 6:
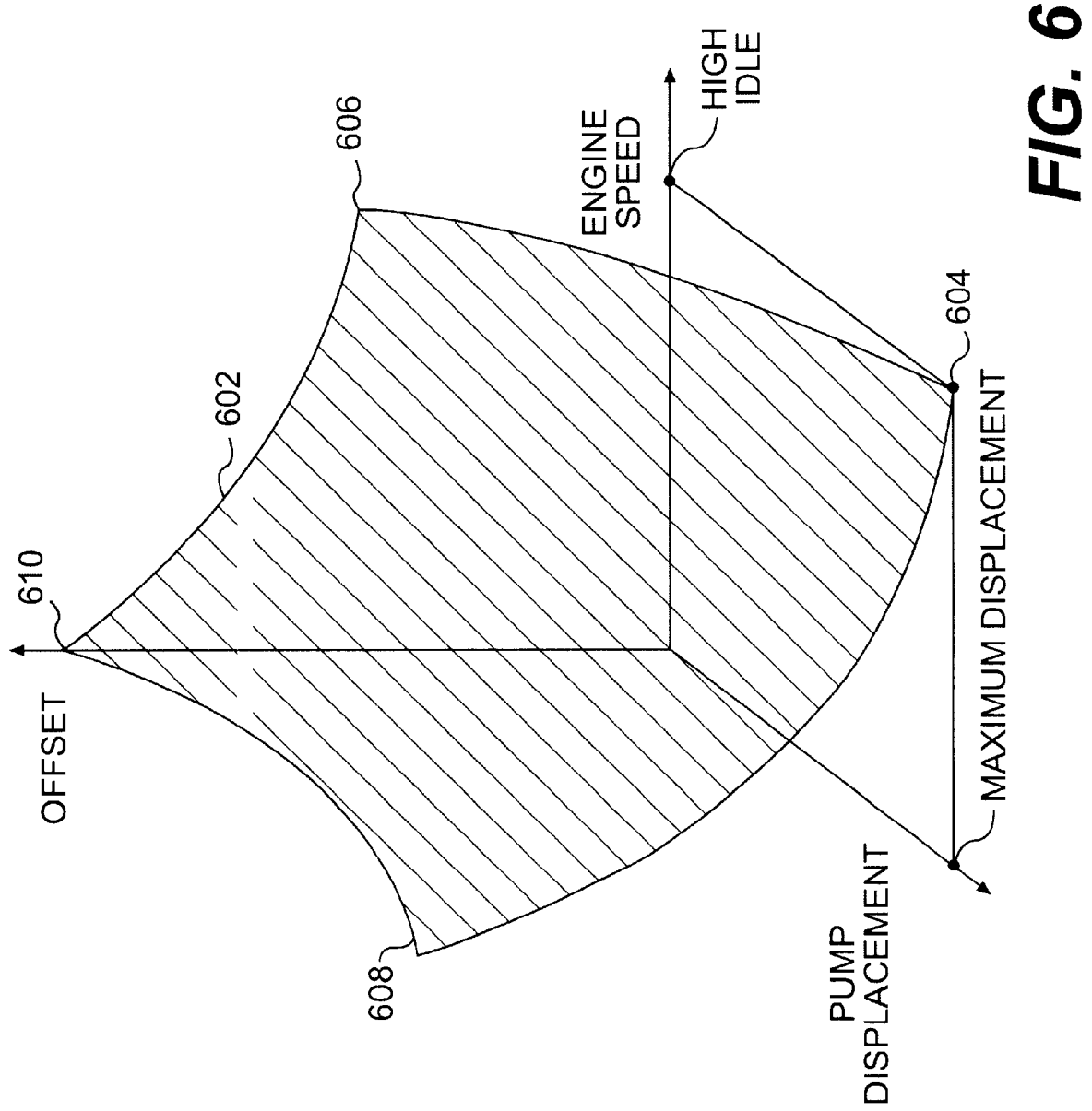
FIG. 6 is a graph of valve command offset as a function of pump displacement and engine speed in an exemplary embodiment of the present invention.

In an exemplary embodiment of the present invention, a three dimensional calibration offset map may be developed for varying engine speed and pump displacement at a predetermined position of the linkage, as illustrated in FIG. 6. The calibrated offset map 602 is one example of an offset map for varying engine speed and pump displacement. At point 604, the engine speed is at high idle and the pump displacement is maximum. Therefore, the offset generated is zero because these are the conditions at which the calibrated command curve was generated. As engine speed decreases, to point 608 for example, the offset may increase. As pump displacement decreases, to point 606 for example, the offset may also increase. As both decrease to point 610, the offset may increase to a maximum position.

It should be appreciated that a plurality of calibrated offset maps 602 may be developed for varying engine speed and pump displacement at each of a plurality of linkage positions. An offset map 602 may be selected based on a sensed linkage position during operation, and the offset point may be determined based on a sensed engine speed and pump displacement. Alternatively, when a sensed linkage position does not precisely correspond with a particular offset map 602, the controller 22 may determine an offset by extrapolating between two offset maps closest to the sensed linkage position.

In an alternative embodiment of the present invention, a calibration command curve may be empirically established for each engine speed, pump displacement, and linkage position such that each curve results in the established first motion deadband. During the operation of the machine, the appropriate curve may be selected based on engine speed, pump displacement, and linkage position. The appropriate valve command is then selected from the appropriate calibrated curve in response to the operator input.

In yet another embodiment, the valve command may be dynamically determined in response to the calibrated command curve 302 and the operator input. That is, instead of using a predetermined command curve for a linkage position, engine speed, or pump displacement variation, the valve command is dynamically determined using equations established to result in a command curve having the calibrated first motion deadband. For example, a valve command multiplier may be determined. The valve command multiplier may operate such that the joystick input may be modified based on a linkage position. A multiplier associated with the linkage position may ensure that the deadband will occur at a consistent joystick position.

In another embodiment of the present invention, the command curves and associated offset may be established based upon variations in the flow rate and linkage position. That is, instead of having a command curve for a particular engine speed, pump displacement, and linkage position, the curve may be based directly on the flow rate and/or pressure of the fluid and the linkage position. The flow rate may either be calculated based on the engine speed and pump displacement, or a flow sensor may be used to measure the flow directly. Therefore, during the operation of the machine, the flow rate and linkage position are determined and the appropriate command curve or offset table is selected, based on the determined flow rate and linkage position, to determine the appropriate valve command.

In another embodiment of the present invention, calibration offsets may be determined for a particular work function, as well as varying engine speeds, pump displacements, and linkage positions. For example, the work functions for an earth moving machine such as a wheel loader may include a bucket raise function, bucket lower function, rack function, and dump function. Each work function may operate at different circuit conditions and require different joystick inputs. For example, a raise bucket command may need a rearward position of the joystick, as opposed to a lower blade command, which may need a forward position of the control lever mechanism 28, 30, for example, a joystick. Therefore, when an operator input is received, the engine speed, pump displacement, linkage position, and current work function, which are a condition of the hydraulic circuit 104, may be determined. The valve command may then be determined in response to the appropriate calibrated command curve, and calibration offset as described above. Accounting for the work function may also account for the anticipated load experienced by the work implement and associated actuators. Therefore, in one embodiment, accounting for the work function may increase the accuracy of the resulting first motion deadband.

In another alternative embodiment, a closed center valve may be used in the valve assembly 120. Calibration command curves and offset tables analogous to the curves and tables described above for the embodiment using open centered valves may be established and used in the same manner to provide a consistent first motion deadband to an operator.

Industrial Applicability

In operation, when an operator commands a work implement to move, by controlling the appropriate joystick 28, the command is received by a controller 22. The controller 22 may determine the appropriate valve command in response to the operator input and a position of the linkages 54, 56 associated with the actuators 44, 45. The valve command may be determined by determining a condition of the hydraulic circuit 104 such as, for example, the engine speed, pump displacement, and/or current work function of the machine. The operator input, the linkage position, and the current circuit conditions may be used in conjunction with a calibrated command curve to determine a calibrated valve command. In an exemplary embodiment, a valve offset table may also be accessed to determine a calibrated offset in response to the current joystick input and circuit conditions.

The calibrated offset may then be added to the calibrated valve command, and the resulting valve command is delivered to the valve assembly 120, 122. The delivered valve command may result in a first motion deadband consistent with the established first motion deadband. A consistent first motion deadband may provide a consistent implement control interface for the operator that may result in more efficient machine operation and reduce operational errors. The disclosed system has wide application in any number of work machines.

It will be readily apparent to those skilled in this art that various changes and modifications of an obvious nature may be made. Other embodiments of the invention will be apparent to those skilled in the art from consideration of the specification and practice of the invention disclosed herein. It is intended that the specification and examples be considered as exemplary only.

What is claimed is:

1. A method for controlling a fluid system, the system including a hydraulic circuit having a pump driven by an engine, the pump delivering fluid to an actuator through a valve assembly, the method comprising:

receiving an operator input;

determining a condition of the hydraulic circuit, the condition of the hydraulic circuit including at least one of a flow rate of fluid to the actuator, an engine speed, and a pump displacement;

determining a valve transform function as a function of the condition of the hydraulic circuit and a position of a linkage associated with the actuator;

determining a valve command in response to the valve transform function and the operator input, the valve command resulting in a consistent deadband; and delivering the valve command to the valve assembly.

2. The method of claim 1, further including determining the engine speed and the pump displacement.

3. The method of claim 1, further including establishing a first deadband.

4. The method of claim 3, wherein the valve command is further determined in response to the first deadband.

5. The method of claim 3, further including determining a valve command offset in response to the determined hydraulic circuit condition and the first deadband.

6. The method of claim 5, wherein the valve command is further determined in response to the valve command offset.

7. The method of claim 3, wherein the consistent deadband is within a predetermined threshold of the first deadband.

8. The method of claim 3, wherein the first deadband is established in response to a previous circuit condition, a previous operator input, and a previous valve command.

9. The method of claim 1, wherein the consistent deadband is a first motion deadband.

10. The method of claim 9, wherein the first motion deadband includes a valve assembly deadband.

11. The method of claim 1, further including determining a work function of the hydraulic circuit, the valve command being further determined in response to the work function.

12. The method of claim 1, further including determining the flow rate to the actuator based on at least one of the engine speed and the pump displacement.

13. A method for controlling a fluid system, the system including a hydraulic circuit having a pump driven by an engine, the pump delivering fluid to an actuator through a valve assembly, comprising:

establishing a first motion deadband;

receiving an operator input;

determining a position of a linkage associated with the actuator;

determining a flow rate of fluid to the actuator; and determining a valve command in response to the linkage position and at least one of the fluid flow rate, the first motion deadband, and the operator input, the valve command resulting in a consistent deadband.

14. A fluid system, comprising:

a hydraulic circuit including
  a pump,
  an engine structured and arranged to drive the source of pressurized fluid,
  an actuator, and
  a valve assembly operable to control flow of pressurized fluid from the source of pressurized fluid to the actuator;

a linkage associated with the actuator;

an input controller configured to receive an operator input and responsively generate an input signal; and a controller configured to receive the input signal, a linkage position signal, and at least one of a flow rate signal corresponding to fluid flow to the actuator, an engine speed signal, and a pump displacement signal, the controller being configured to determine a valve transform function in response to the linkage position signal and at least one of the fluid flow rate signal, the engine speed signal, and the pump displacement signal, the controller being further configured to determine a valve command in response to the input signal and the valve transform function, the valve command resulting in a consistent deadband.

15. The system of claim 14 wherein the controller is further configured to establish a first motion deadband.

16. The system of claim 15, wherein the controller is further configured to determine the valve command in response to the first motion deadband.

17. The system of claim 14, wherein the controller is configured to determine the valve command further in response to a work function of the hydraulic circuit.

18. The system of claim 14, wherein the controller is configured to determine a fluid flow rate in response to at least one of the engine speed signal and the pump displacement signal.

19. The system of claim 14, wherein the controller is further configured to deliver the valve command to the valve assembly.

* * * * *